United States Patent

Robu et al.

[11] Patent Number: 5,404,992
[45] Date of Patent: Apr. 11, 1995

[54] SUSPENSION CONVEYOR SYSTEM

[75] Inventors: Johann Robu, Olching; Robby Enderlein, Landsberg/Lech, both of Germany

[73] Assignee: RSL Logistik GmbH & Co., Landsberg/Lech., Germany

[21] Appl. No.: 102,363

[22] Filed: Aug. 5, 1993

[30] Foreign Application Priority Data

Aug. 6, 1992 [DE] Germany .................. 9210549 U
May 17, 1993 [EP] European Pat. Off. ......... 93108022

[51] Int. Cl.6 ............................................ B65G 29/00
[52] U.S. Cl. .................................. 198/465.4; 198/678.1
[58] Field of Search ................. 198/465.4, 687.1, 686, 198/685, 678.1

[56] References Cited

U.S. PATENT DOCUMENTS 3,777,872 12/1973 Rikman et al. .

FOREIGN PATENT DOCUMENTS

| 0338500 | 10/1989 | European Pat. Off. | 198/465.4 |
| 0343399 | 11/1989 | European Pat. Off. | 198/465.4 |
| 0813769 | 5/1959 | United Kingdom | 198/678.1 |
| 0928359 | 6/1963 | United Kingdom | 198/678.1 |

*Primary Examiner*—Cheryl L. Gastineau
*Attorney, Agent, or Firm*—Finnegan, Henderson, Farabow, Garrett & Dunner

[57] ABSTRACT

A suspension conveyor system (1) comprising a conveyor device (3) rolling along a track rail (2) with straight track sections, curves and/or switches. The conveyor device includes a bearing member (11), which is provided with a support member (17) for the articles to be conveyed, and at least two casters (12a, 12b) arranged on the bearing member (11) symmetrically with respect to each other with regard to a plane of symmetry (13). The track rail (2) has at least one running track (7) along which one of the casters (12a, 12b) rolls. In order to simplify the structural design of such a suspension conveyor system and in order to make it more universally applicable, the conveyor device has a bearing member (11) extending in the plane of symmetry (13) as well as casters (12a, 12b) projecting outwards from both sides of the bearing member (11), and the conveyor device (3) and the track rail (2) are constructed for use in a lateral suspension mode for movement over straight track sections, curves and/or switches, the plane of symmetry (13) being maintained essentially perpendicularly by a support, which is provided between the conveyor device (3) and the track rail (2). The conveyor device rolls always along only one running track (7) at the time, the caster running along the running track (7) being selectively the caster (12a, 12b) arranged on one side of the plane of symmetry (13) or on the other side thereof, whereas the free caster (12b, 12a) arranged on the respective opposite side of the plane of symmetry (13) is not in engagement with a running track (7).

33 Claims, 9 Drawing Sheets

SUSPENSION CONVEYOR SYSTEM

The present invention refers to a suspension conveyor system.

Such a suspension conveyor system is known from DE-A-36 37 287. The conveyor means of the known suspension conveyor system is provided with a C-shaped bow, an inwardly projecting caster being rotatably supported on each of the two free ends of said bow. With the aid of these casters, the known conveyor means rolls along a profiled rail with two running tracks which abut on each other in a roof shape. During operation in the centrally suspended position on this roof-shaped sliding rail, the plane of symmetry between the two casters extends essentially perpendicularly. In order to be able to convey the known conveyor means with the least possible amount of jerks even through sharp bends, a changeover device is provided, which rotates the conveyor means about an axis, extending in the direction of transport, to the right or to the left in such a way that the plane of symmetry between the casters extends at an oblique angle and that one of the casters can roll along a horizontal running track. For the other caster, an additional running track is provided by means of which this caster is supported so as to prevent the conveyor means from rotating back to its original position under the influence of gravity. Although the scope of tasks can be extended markedly by this change-over means of the known suspension conveyor system, the construction is not yet satisfactory.

In addition, DE-A-22 55 251 discloses a suspension conveyor system, which can only be operated in a lateral suspension mode. The conveyor means of the known suspension conveyor system has an approximately C-shaped bearing member extending around the rail from one side, one of the free ends of said bearing member having arranged thereon a single caster and the other free end being provided with a fastening means for the articles to be conveyed. The circumferential surface of the caster is provided with an internal profile, which is adapted to be engaged by an external profile of the sliding rail so as to prevent tilting to the side. The fields of use of this suspension conveyor system are limited. As soon as switches are provided in the track rail, the bearing members must always be arranged on the same side of the rail, since, otherwise, they will collide with the switches. Moreover, the known suspension conveyor system requires switches having a special structural design in cases in which the conveyor means are to be conveyed forwards and backwards on the same rail.

U.S. Pat. No. 3,777,872 discloses conveyor means comprising a bearing member arranged in the plane of symmetry between two casters as well as two casters projecting outwardly from said bearing member on both sides thereof. However, the known conveyor means run as socalled internal casters inside a profiled rail, which is provided with a central slot through which the bearing member extends and which has two running tracks arranged on either side of said slot. The casters of each conveyor means are always in engagement with the two running tracks. However, suspension conveyor systems for these internal casters require e.g. comparatively complicated switches.

Furthermore, DE-A-29 10 780 or FR-A-2 142 980, for example, disclose the measure of providing separate casters for transferring the conveyor means from one conveying track to a different one, said casters being, however, not used for transporting the conveyor means in a lateral suspension mode along a track rail with straight track sections, curves and/or switches.

Hence, it is the object of the present invention to simplify the structural design of a suspension conveyor system of the above-mentioned type and to construct said suspension conveyor system such that it will be reliable in function.

On the basis of the combination according to the present invention, which combines a conveyor means having symmetrically arranged casters with asymmetrical rails, i.e. rails provided with only one running track, wherein said conveyor means runs in a lateral suspension mode on a track rail of the type in question, and on the basis of the possibility of changing the respective caster which comes into engagement with the running track, switches or branches can have an extremely simple structural design. Moreover, the conveyor means can easily be raised from the rail at almost any point of the track rail, and it can be reattached to the running track in the same direction, or rotated by 180° about a perpendicular axis, again at almost any point of the track rail. The time-consuming emplacement onto or into the rails, which is required in the case of the prior art, can be dispensed with.

Alternative embodiments of casters and running tracks are, on the one hand, used for reliably holding the conveyor means on the rail, although only one caster is in engagement with the running track, and, on the other hand, they serve to improve the curve-going properties of the conveyor means markedly, even in sharp bends.

A tilt protection means is provided that prevents the conveyor means from falling off the rail, if subjected to a push or blow from the side.

Switches or branches are also provided for use with the suspension conveyor system according to the present invention and having a particularly simple structural design. As well as transfer means that permits very short switching times so that it will be possible to purposefully remove individual conveyor means from a series of conveyor means arriving in direct succession. Switching times which are as short as the present ones cannot be achieved by any of the switches which are to be used in the above-mentioned prior art; these prior art switches require in any case a larger distance between the conveyor means to be transferred and its precursor and successor.

Very sharp bend radii can be also realized with the aid of the suspension conveyor system according to the present invention.

In view of the fact that the conveyor means according to the present invention can selectively run on the first or on the second caster alone, the direct transfer of conveyor means between two rail circles can be carried out with the aid of structurally very simple means.

On the basis of the structural design of the guide means for the friction belt, said friction belt can be inserted into the guide means in a simple manner by introducing it in an oblique condition and by bringing it then into contact with said guide means, and it can be removed from said guide means by carrying out the above-mentioned steps in reverse order.

The body, whose shape can be varied, serves to bring the conveyor means out of their driving engagement with the friction belt, e.g. for the purpose of removing them.

Finally, additional friction material improves the driving effect of a friction belt drive.

In the following, embodiments of the present invention will be explained in detail on the basis of the drawings, in which:

FIG. 1 is a perspective and schematic representation of part of a first embodiment of a suspension conveyor system according to the present invention, FIG. 2 is a front sectional view of the conveyor means of FIG. 1 taken along the line II—II, FIG. 3 is a sectional view taken along the line III—III of FIG. 1, FIG. 4 is a schematic representation of the transfer means of FIG. 3, FIG. 5 is a schematic representation of an additional transfer means, FIG. 6 is a schematic representation of an additional conveyor means, FIG. 7 is a schematic representation of an additional transfer means, FIG. 8 is a top view of FIG. 7.

Figure 1:
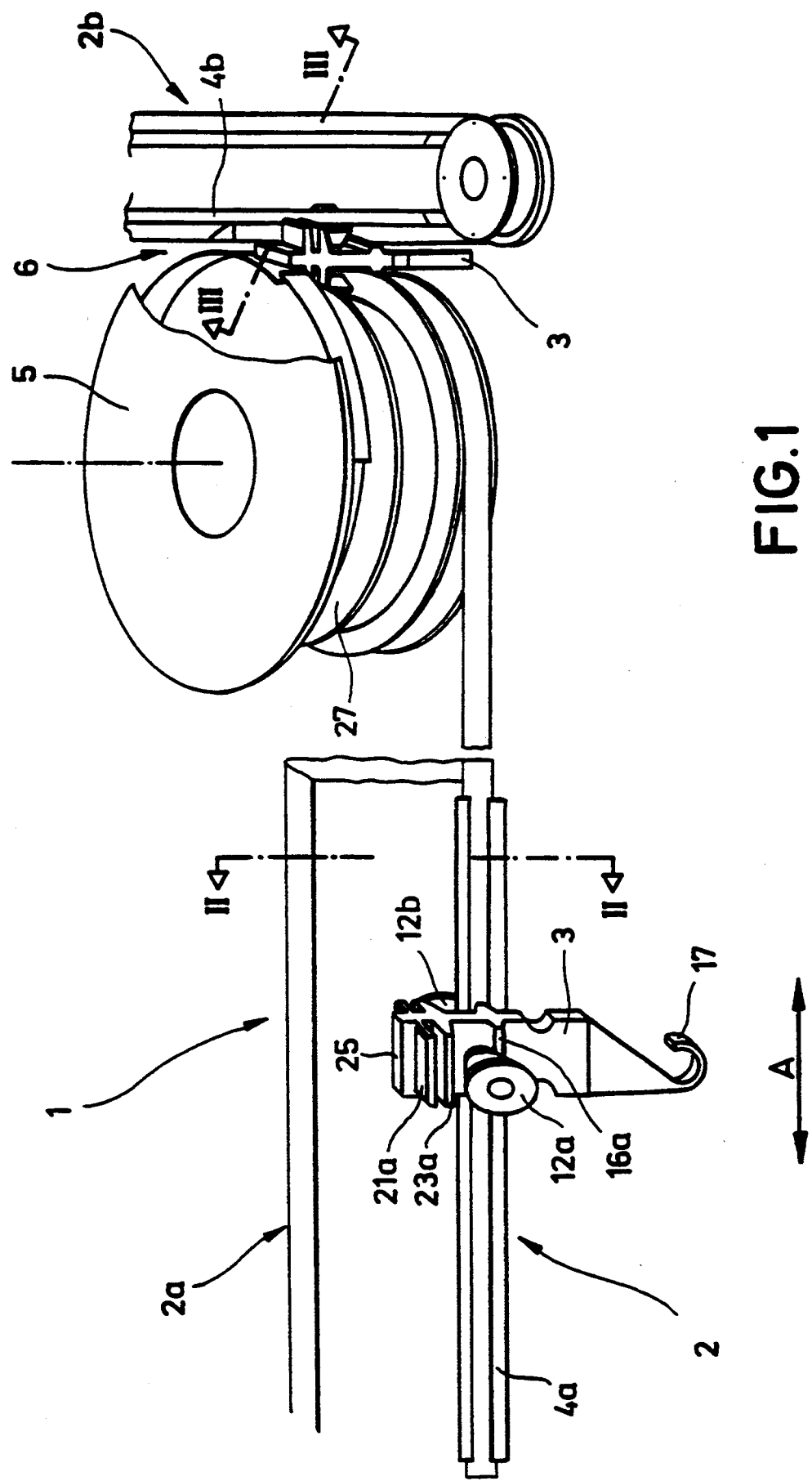

FIG. 1 shows a suspension conveyor system 1 comprising a track rail 2 and conveyor means 3, which roll along said track rail 2. In the embodiment shown, said track rail 2 comprises a first rail circle 2a and a second rail arrangement 2b. As far as the first rail circle 2a is concerned, only part of a rail 4a used for travelling straight on, a tail drum 5 for cornering and a transfer means 6 are shown, said transfer means 6 acting as a switch and being outlined only schematically. The second rail arrangement 2b extends with a rail 4b, which is used for travelling straight on, tangentially to said tail drum 5. The further structural design of the second rail arrangement 2b is uncritical. As can be seen in the figure, it can, for example, only be used for linear transport or conveyance to other rails, or it can, analogously with the first rail circle 2a, be constructed with tail drums for a complete circulation of the conveyor means 3.

Figure 2:
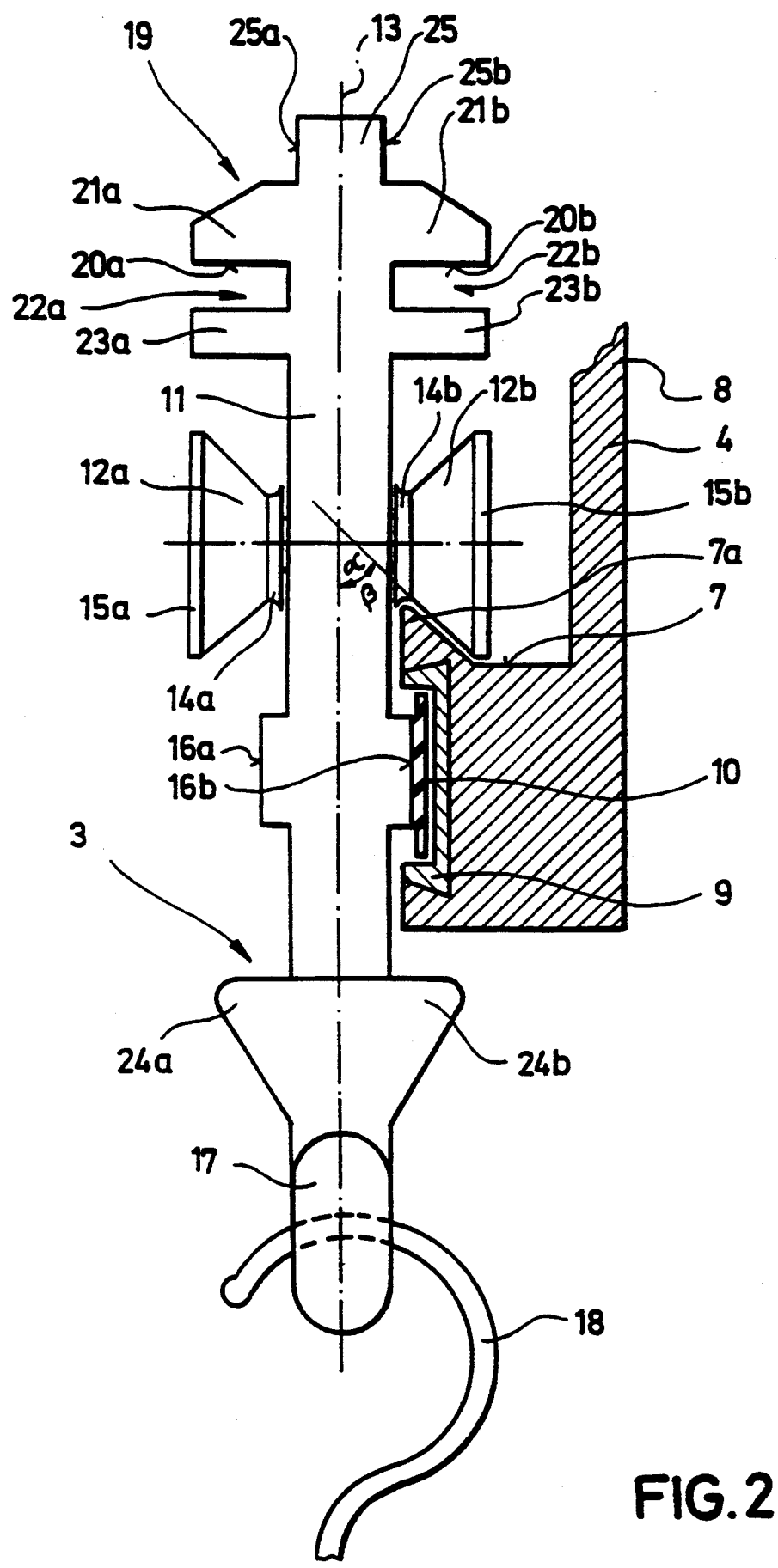

As can be seen in detail from FIG. 2, the rail 4 of the straight track section and of other track sections, e.g. of curves or the like, is constructed asymmetrically and provided with a running track 7 for the conveyor means 3. The running track 7 is suspended from the ceiling or from a separate framing via a suspension carrier 8 and extends, at least across part of its width, from the suspension carrier 8 at an oblique angle upwards and outwards, where it ends in a rounded tip 7a. Below the running track 7, a guide means 9 is provided in which a vertically arranged friction belt 10 extends.

The conveyor means 3 comprises a bearing member 11 in the form of a vertical support from which a frusto-conical caster 12a and 12b, respectively, projects on either side. The casters 12a, 12b are symmetrical with respect to a vertical plane of symmetry 13 extending through the longitudinal center line of said bearing member 11, and they are supported on opposite sides of said bearing member 11 with horizontal axes of rotation. Each of the casters 12a, 12b faces the bearing member 11 with the narrower end of its frusto-conical shape, a chamfer 14a, 14b being respectively formed at this point and the caster being seated on the tip 7a of the running track 7 by means of said chamfer. The angle α, which is enclosed by a surface line of the casters 12a, 12b and by the plane of symmetry 13, is preferably 45°. Also the inclined part of the running track 7 extends at this angle. The broad end of each caster 12a, 12b is followed by a cylindrical section 15a, 15b.

Below the casters 12a, 12b, friction surfaces 16a, 16b project from the bearing member 11 in the area of the friction belt 10, said friction surfaces 16a, 16b being arranged in spaced symmetrical relationship with the plane of symmetry 13 and extending parallel to the direction of transport A (cf. FIG. 1). The friction surfaces 16a, 16b are brought into engagement with the friction belt 10 for driving the conveyor means 3.

Extending the plane of symmetry 13, the lower end of the bearing member 11 has formed thereon a hook 17 used as a fastening means for articles to be conveyed, the article shown in the present case being part of a coat hanger 18. Due to the arrangement of the hook 17 in the plane of symmetry 13 and below the friction surfaces 16a, 16b, the friction surface 16b will be pressed against the friction belt 10 in the position of the conveyor means 3 shown in FIG. 2, and this will guarantee, on the one hand, that the conveyor means 3 will effectively be carried along when the friction belt 10 is moving and, on the other hand, that the conveyor means 3 is additionally supported by the rail 4.

Above the casters 12a, 12b, an additional travelling system or arm 19 is provided on the conveyor means 3 alternatively to or in addition to the casters 12a, 12b. The additional travelling system or arm 19 has two horizontal sliding surfaces 20a and 20b, which are arranged symmetrically with respect to the plane of symmetry 13 and which face downwards. The sliding surfaces 20a, 20b define the respective lower surfaces of two crosspiece plates 21a, 21b projecting, symmetrically with respect to the plane of symmetry 13, outwards from both sides of the bearing member 11. Below these crosspiece plates 21a, 21b, second crosspiece plates 23a, 23b are arranged whose size corresponds approximately to that of the crosspiece plates 21a, 21b, an interspace 22a, 22b being provided between said upper and lower crosspiece plates. The lower crosspieces 23a, 23b serve as a tilt protection means.

An additional tilt protection means in the form of two projections 24a, 24b, which protrude laterally outwards symmetrically with respect to the plane of symmetry 13, is provided on the bearing member 11 below the friction surfaces 16a, 16b of the friction drive. The laterally protruding projections 24a, 24b are long enough for extending up to a point below the rail 4.

The upper surface of the bearing member 11 has formed thereon a longitudinal flange 25, which extends in the direction of transport A and which is located in the plane of symmetry 13, said longitudinal flange 25 having two surfaces 25a and 25b, respectively, which extend parallel to the plane of symmetry 13 and which face to the side.

Figure 3:
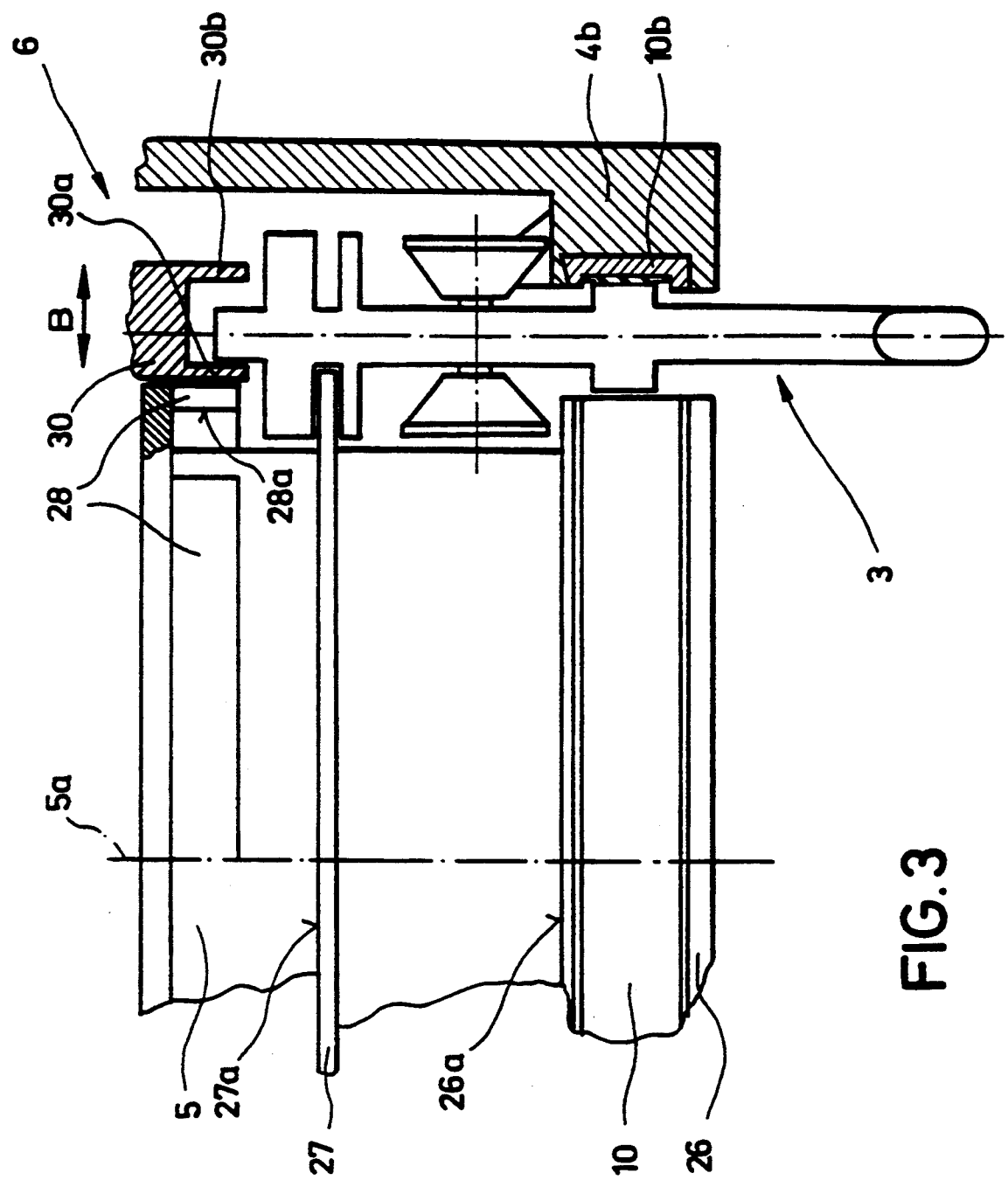
Figure 4:
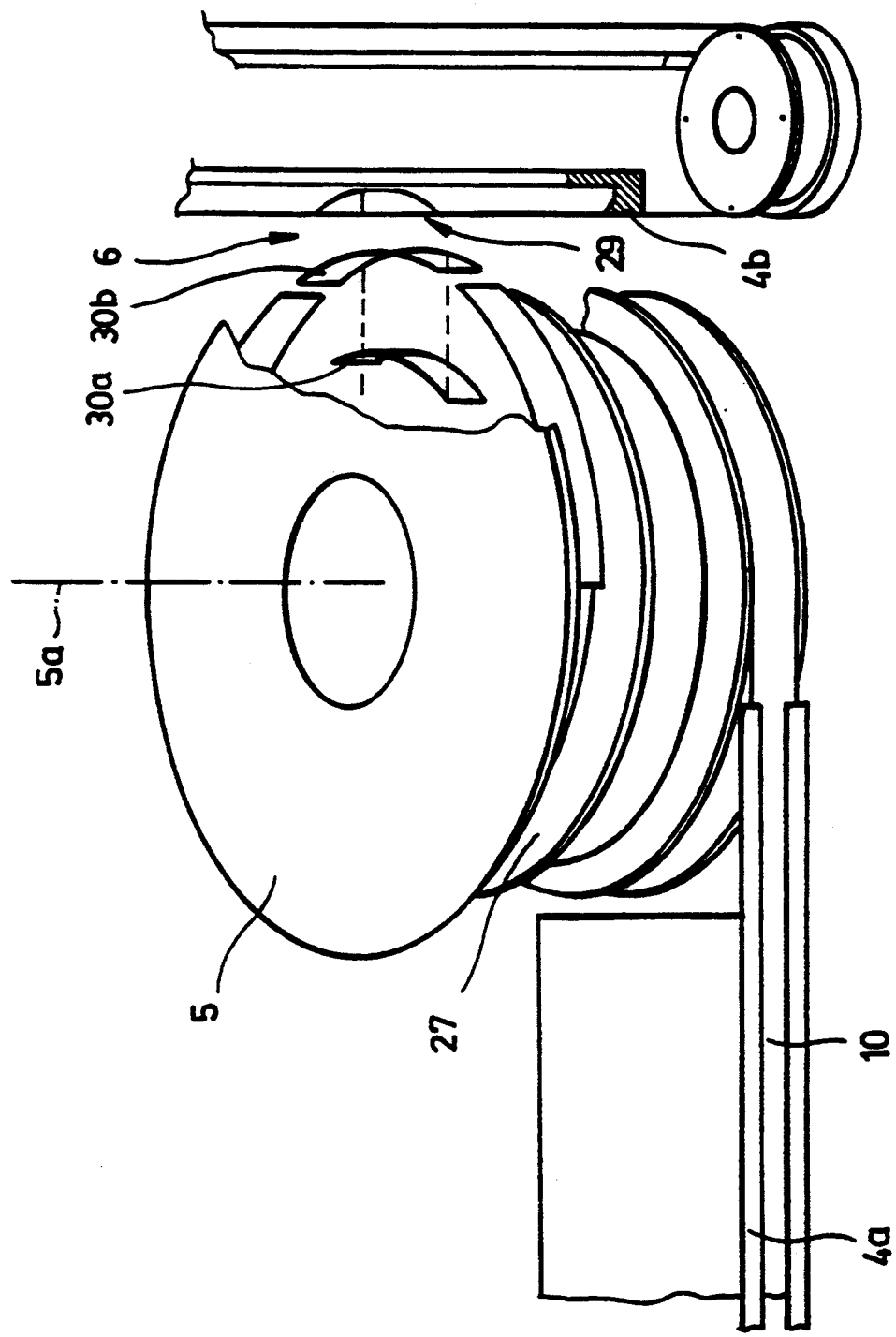

FIG. 3 and 4 show in a schematic, enlarged representation the tail drum 5 in the area of the transfer means 6. The tail drum 5 is provided with a driving flange 26 in which the friction belt 10 runs. The upper surface 26a of the driving flange 26 extends horizontally and flat and is arranged on such a level that it will be in alignment with the cylindrical section 15a, 15b of the caster of the conveyor means arriving, or, preferably, on such a level that it will extend just below said cylindrical section.

Above the driving flange 26, a conveying flange 27 projects from the circumference of the tail drum 5, the diameter of said conveying flange 27 being larger than the diameter of the driving flange 26 and the upper surface 27a thereof being constructed as a sliding surface which corresponds to the sliding surfaces 20a, 20b of the conveyor means 3. The conveying flange 27 is arranged such that it is adapted to engage the interspace 22a, 22b between the crosspiece plates 21a, 23a and 21b, 23b, respectively, when the conveyor means 3 has arrived at the tail drum 5. The conveying flange 27 rotates about the perpendicular axis 5a of the tail drum 5 and entrains the conveyor means 3 seated on said conveying flange 27 with its respective abutting sliding surface 20a and 20b.

Above the conveying flange 27, a stationary guide ridge 28 is provided, which extends, in a roughly semi-circular configuration approximately from the point where the friction belt 10 meets the driving flange 26 up to the point where the friction belt 10 leaves the driving flange 26, around the circumference of the tail drum 5 and which projects downwards. The internal surface 28a of the guide ridge 28 is constructed as a guide means for the surface 25a, 25b of the longitudinal flange 25 of the conveyor means 3 and it holds the conveyor means 3 on the tail drum 5 against centrifugal and other forces. This guide ridge 28 is interrupted in the area of the transfer means 6 (cf. FIG. 4). At the same point, the rail 4b of the second rail arrangement 2b is provided with a cut-out portion 29, which has been cut deeply enough for removing at least the oblique portion of the running surface 7 of said rail 4b.

The transfer means 6 is provided with a pusher 30, which has two downwardly projecting webs 30a, 30b and which is adapted to be moved in the direction of the double arrow B (FIG. 3). The movement of the pusher 30 of the transfer means 6 is carried out such that, in the position shown in FIG. 4, the web 30b, which is the web on the right-hand side in FIG. 3, will close the gap in the guide ridge 28 of the tail drum 5 so that the conveyor means 3 will be guided round the tail drum 5, the surface 25a of the longitudinal flange 25 of the conveyor means 3, which is the outer surface with respect to the axis of rotation 5a, abutting on the guide ridge 28 and on the web 30b of the pusher 30, and the web 30a of the pusher 30 being moved out of the path of the longitudinal flange 25.

In the second end position of the pusher 30, the web 30a of the pusher 30, which faces the axis of rotation 5a of the tail drum 5, is arranged such that it comes into engagement with the surface 25a of the longitudinal flange 25, which faces said axis of rotation 5a. The further course of the web 30a will then force the conveyor means 3 to carry out a movement towards the rail 4b so that the conveyor means 3 will, through the cut-out portion 29, change over to the rail 4b with the hitherto unengaged caster, which is the caster 12a in the embodiment shown, whereupon it will come out of engagement with the conveying flange 27 and remain, consequently, on the rail 4b, whereas said conveying flange 27 continues to rotate. On the rail 4b, the conveyor means 3 will then come into engagement with a friction belt 10b of the rail 4b, whose structural design is analogous to that of the friction belt 10, and it will be moved out of said cutout portion by said friction belt 10b.

The pusher 30 preferably moves about a perpendicular axis, but linear movements are possible as well.

Figure 5:
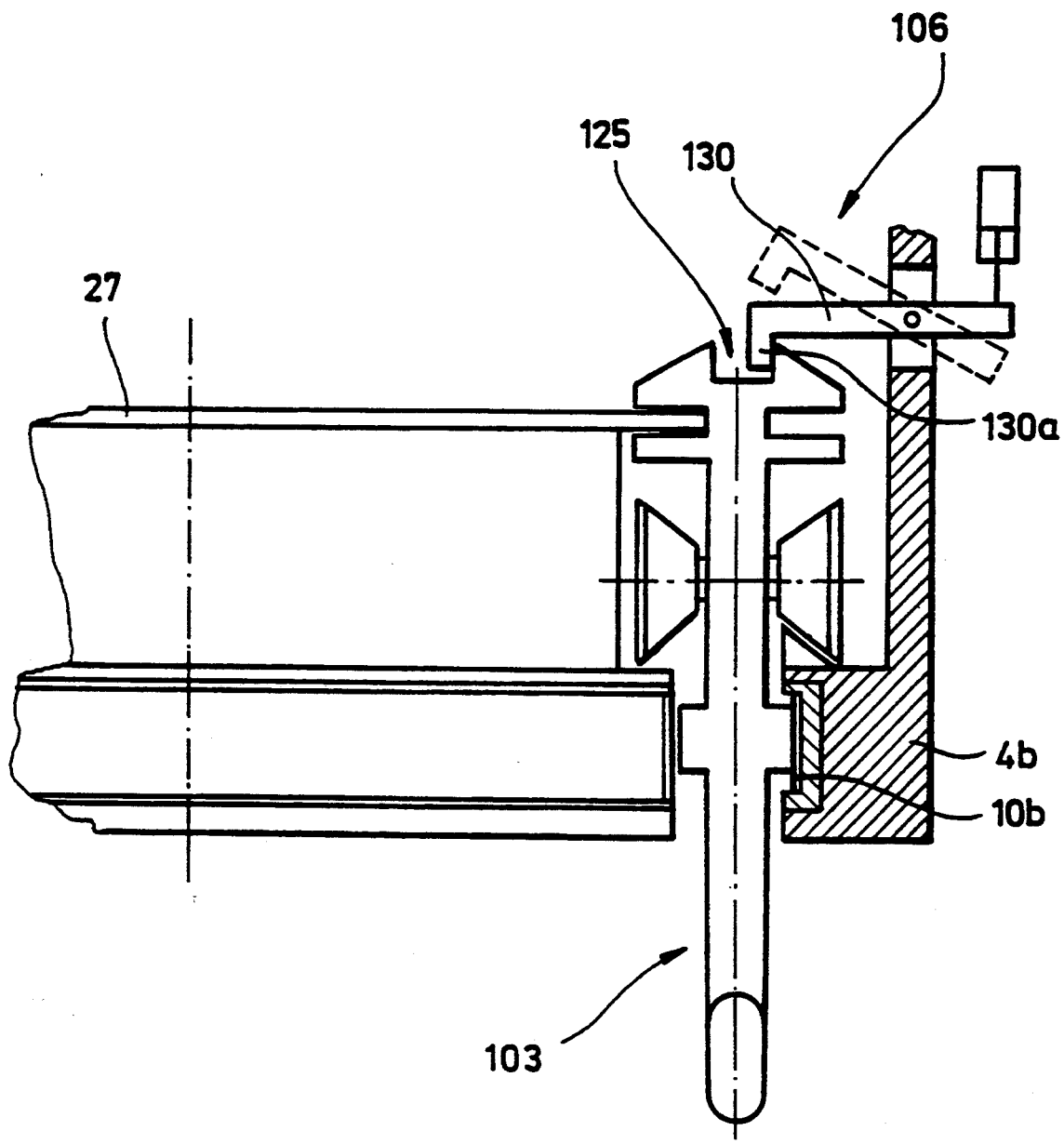

FIG. 5 shows an additional embodiment of a transfer means 106, which differs from the transfer means 6 only insofar as, instead of the pusher, a tilt guide means 130 is provided, which is adapted to be pivoted from above into the transport path of a slightly modified conveyor means 103. The conveyor means 103 differs from the conveyor means 3 according to FIG. 1 to 4 only insofar as a longitudinal groove 125 is provided instead of a longitudinal flange, said longitudinal groove 125 being adapted to be engaged by a guide ridge 130a of the tilt guide means 130 while the conveyor means 103 is being transported on the conveying flange 27 of the tail drum 5. When the guide ridge 130a of the tilt guide means 130 has been pivoted into the longitudinal groove 125, the conveyor means 103 will be held back on the rail 4b and drawn into engagement with the friction belt 10b of said rail 4b while the conveying flange 27 is moving on. If the guide ridge 130a is not in engagement with the longitudinal groove 125, the conveyor means 103 will be moved round the tail drum by the conveying flange 27, optionally supported by a guide means provided subsequent to the guide ridge 28.

When the suspension conveyor system according to the present invention is in operation, the conveyor means 3 and 103, respectively, run on the rail 4a of the first rail circle 2a, as shown in FIG. 1, the caster 12b being in engagement with the rail 4a. The opposite caster 12a is free. The drive is effected via the friction surface 16b, which is in engagement with the friction belt 10 and which simultaneously maintains the plane of symmetry 13 in its essentially vertical orientation. Since, for the purpose of reducing the friction, the tip 7a of the running track 7 should run in the chamfer 14b of the caster 12b, it can be expedient to provide the friction surface 16b (and also 16a), which serves as a contact surface, at a slightly smaller distance from the plane of symmetry 13 than the chamfer 14a, 14b so that the bearing member 11 and 111, respectively, will have a very slight tilt and the peripheral surface of the caster 12b will slightly be raised from the running track.

When the conveyor means 3, 103 reaches the area of the tail drum 5, the conveying flange 27 descends into the interspace 22b between the two crosspiece plates 21b and 23b. When the caster 12b then moves from the rail 4a to the upper surface 26a of the driving flange 26, the sliding surface 20b will engage the conveying surface 27a of the conveying flange 27 from above and the conveyor means 3, 103 will be entrained when said conveying flange 27 rotates.

If the conveyor means 3 is to be shifted from the first part 2a of the track rail 2 to the second part 2b of the track rail 2, the pusher 30 will be moved to a position in which the web 30a of said pusher 30 bars the way on which the conveyor means 3 moves round the tail drum 5. The surface 25b of the longitudinal flange 25 is brought into engagement with the web 30a so that the conveyor means 3 will be displaced outwards by the conveying flange 27 and so that the free, hitherto unengaged caster 12a of said conveyor means 3 will enter the cut-out portion 29 and reach the second rail 4b. The radius of said cut-out portion 29 is preferably adapted to the radius of the tail drum 5 so that the conveyor means 3 is positioned on the second rail 4b where it will be held by the oblique running track of said second rail 4b as soon as the additional travelling system or arm 19 has got away from the conveying flange 27. The friction surface 16a will then also be in engagement with the friction belt 10b of the second rail 4b so that the conveyor means 3 can be transported, in the manner described, on the second rail 4b, but this time in a condition in which it hangs on the other caster 12a.

If such shifting is not to be carried out, the pusher 30 will be moved to a position in which the web 30b closes the gap between the two parts of the guide ridge 28 of the tail drum 5 so that the conveyor means can be transported via the additional travelling system or arm 19 around the tail drum 5 up to a position where an additional, straight rail follows on which the conveyor means can again be transported via the same caster 12b.

Figure 6:
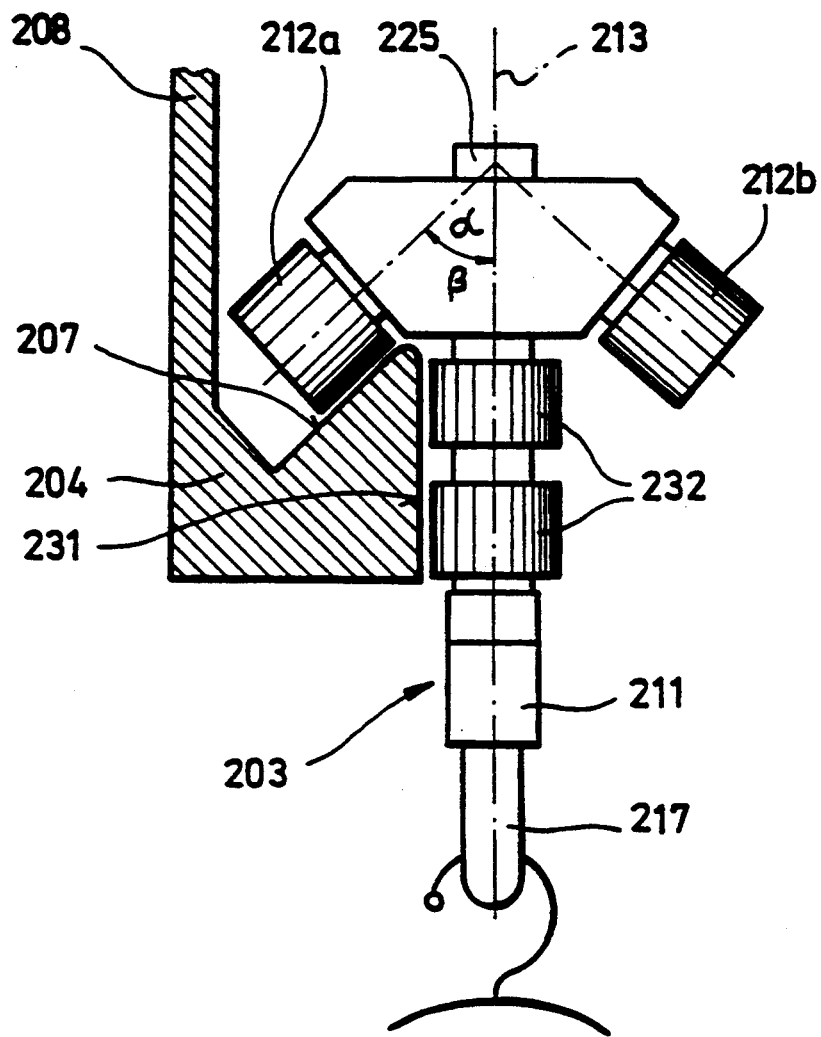

FIG. 6 shows an additional embodiment of a conveyor means 203, which, just as the conveyor means which have already been described, includes a vertically extending bearing member 211 from which two casters 212a and 212b project on the sides symmetrically with respect to a plane of symmetry 213, the bearing member 211 extending in the plane of symmetry 213 between the casters 212a and 212b. The casters 212a, 212b are cylindrical, and they are rotatably supported on the bearing member 211 via axes of rotation, which are directed downwards and which enclose an acute angle α with the plane of symmetry 213.

The conveyor means 203 runs on a rail 204, which differs only insignificantly from the rail 4 with respect to its slightly larger width and which offers sufficient free space so that the cylindrical casters 212a, 212b can roll along it. Also the rail 204 comprises a running track 207, which extends obliquely at the angle α and along which each of the casters 212a, 212b can roll. The rail 204 is asymmetrical and suspended via a carrier 208. On the side facing away from the carrier 208 and facing towards the bearing member 211, the rail 204 comprises a support surface 231, which extends essentially parallel to the plane of symmetry 213 and along which cylindrical support casters 232 can roll, said cylindrical support casters 232 being supported on the bearing member 211 with vertical axes of rotation. The casters 232 rolling along the support surface 231 produce the same effect as the combination of friction surfaces and friction belt of the preceding embodiments, i.e. they serve to maintain the plane of symmetry 213 essentially in its vertical orientation, when the conveyor means is moved along the rail.

Also the bearing member 211 is provided, in a manner which has already been described, with a hook 217 for attaching articles to be conveyed as well as with a guide projection 225, which is adapted to be introduced into a guide means for securing the conveyor means 203, e.g. during cornering. The conveyor means 203 is driven by known drive means, e.g. by carriers, which are arranged on chains, or the like.

Figure 7:
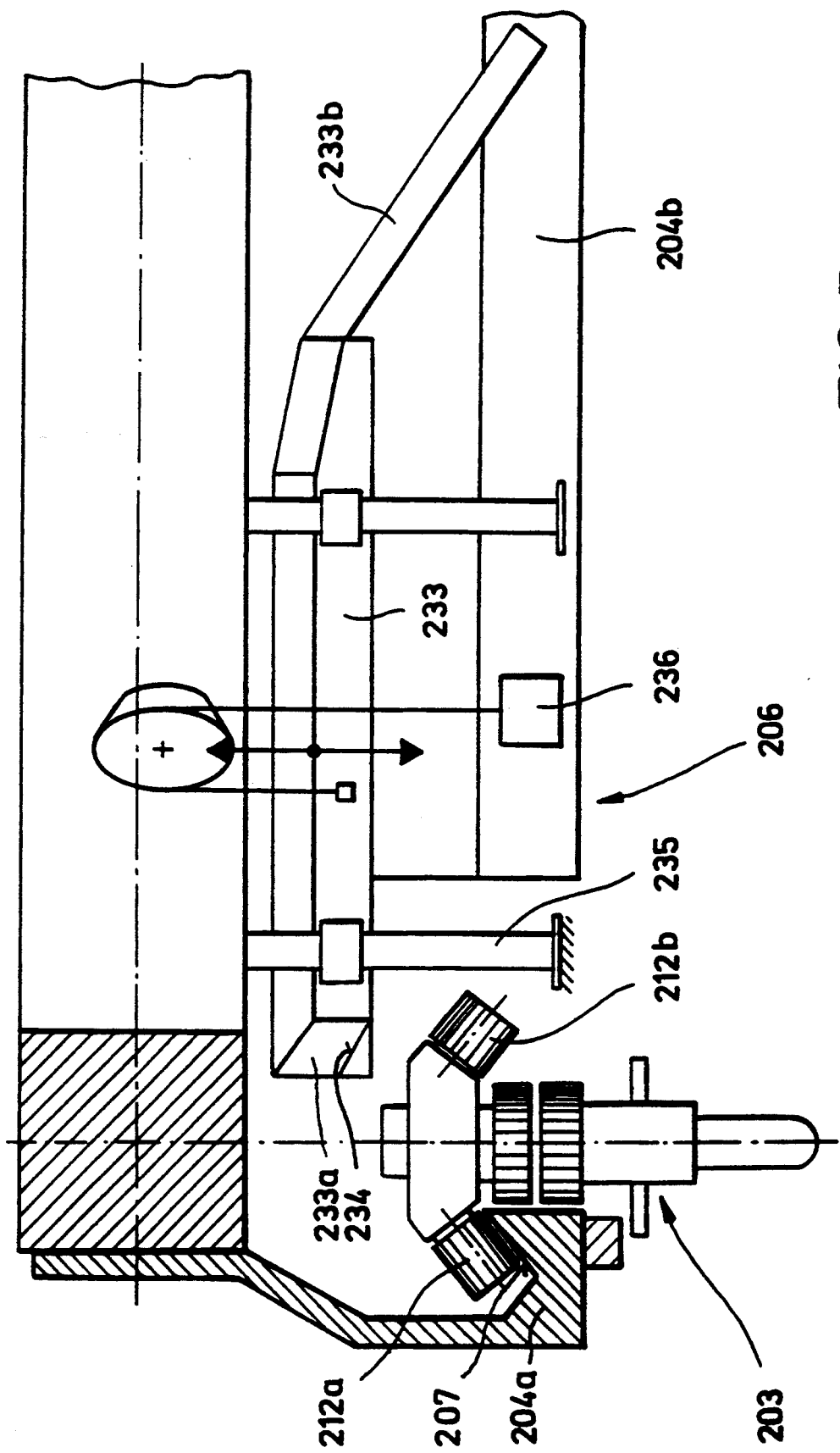
Figure 8:
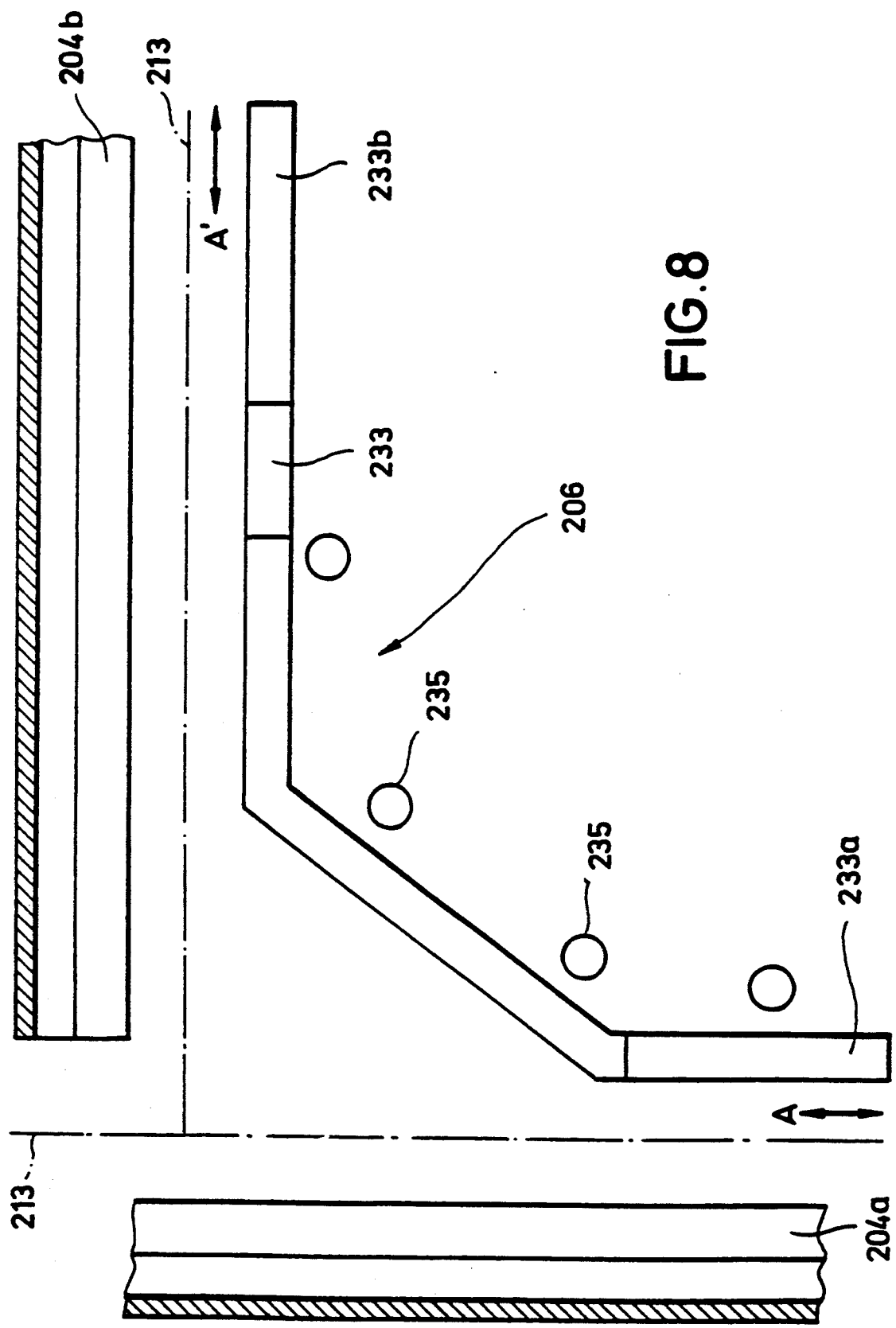

FIG. 7 and 8 describe an additional embodiment of a transfer means 206, which, although it has been described in connection with the conveyor means 203 of FIG. 6, is not limited to cases of use in combination with said conveyor means. The transfer means 206 serves to transfer the conveyor means 203 from a first straight rail 204a to a second straight rail 204b, which extends at an angle—viz. 90° in the case of the embodiment shown—to said first rail 204a and which is arranged on the same level as said first rail 204a. The transfer means 206 includes a switch leg 233 constructed as a rail piece along which the conveyor means 203 can roll, said switch leg 233 including, just as the rails 204a, a running track 234 inclined at an angle α. The switch leg 233 extends from the direction of the first rail 204a towards the second rail 204b, a first free end 233a extending parallel to the first rail 204a and a second free end 233b extending parallel to the second rail 204b. The switch leg 233 is adapted to be moved via vertical guide rods 235 downwards from a first position, in which said switch leg 233 is located in an ineffective position above the conveyor means 203 running on the rails, to a second position, in which the free ends 233a and 233b, respectively, of said switch leg project into the path of the conveyor means 203 approximately at the same distance from the plane of symmetry 213 as said first and second rails 204a, 204b. In this way, each conveyor means 203 travelling e.g. with its left caster 212a on the first rail 204a in the direction of transport A into the area of the transfer means 206 will inevitably move with its right caster 212b onto the free end 233a of the switch leg 233. The free end 233a of the switch leg 233 has the structural design of an ascending ramp; said free end 233a will guide the conveyor means 203 upwards until the left caster 212a has been raised above the uppermost area of the running track 207 so that the conveyor means 203 will be lifted from the first rail 204a and transferred to the switch leg 233. On this switch leg, the conveyor means 203 will be rerouted in the direction of the second rail 204b, whereupon it will move onto the second free end 233b serving as a descending ramp. On this descending ramp 233b, the conveyor means 203 is guided downwards until the left caster 212a is brought into engagement with the running track 207 of the second rail 204b. Subsequently, the conveyor means 203 can be moved to the right in FIG. 8 in the direction of transport A' indicated by the double arrow. When a conveyor means 203 arrives from the right on rail 204b in FIG. 8, it can be transferred to the first rail 204a in an analogous manner. In order to prevent conveyor means 203 which arrive on the second rail from falling out of the track rail at the end of said second rail 204b, the free end 233b of the switch leg 233 can have a shape which is so long and so oblique that, even if the switch leg 233 occupies its raised, i.e. ineffective position, said free end 233b will still project into the path of the conveyor means 203 on the second rail 204b so that the caster of the conveyor means 203 which is at that time not in engagement with the second rail 204b will inevitably move onto this free end. For this function, the switch leg 233 is suspended such that it has the load of a counterweight 236 applied thereto, said counterweight 236 being dimensioned such that the switch leg 233 will be drawn downwards into its effective position by the weight of a conveyor means 203 running from the rail 204b onto the second free end 233b; in said effective position, the first free end 233a will move to the level of the first rail 204a. If, however, the switch leg 233, which has attached thereto the counterweight 236, is to be used for transferring a conveyor means 203 arriving on the rail 204a, it will suffice to draw the switch leg 233 downwards by hand. As soon as the conveyor means 203 has arrived on this switch leg 233, said switch leg will be held in its effective position by the weight of said conveyor means 203. When the conveyor means 203 has left the switch leg 233, said switch leg will move back to its ineffective position under the influence of the counterweight 236.

It follows that the combination of a symmetrical conveyor means with an asymmetrical rail offers the possibility of moving the conveyor means in many different directions without any major structural expenditure. It is, for example, possible to adjoin two closed conveying circles in the form of an eight, the conveyor means running on one caster in the first conveying circle and on the other caster in the second conveying circle. With the aid of the transfer means 6 and 106 in combination with the tail drum 5, the conveyor means can circulate individually in each of said conveying circles, or they can be transferred from the first conveying circle to the second conveying circle, as desired; the transfer means 6 and 106 permit particularly short transfer times so that it is even possible to transfer individual conveyor means from the conveying circuit of a large number of conveyor means succeeding one another in closely spaced relationship.

On the basis of the possibility of making the conveyor means selectively run on the first caster or on the second one, existing track rails can be extended in a simple manner. As can especially be seen in FIG. 7 and 8, branches can additionally be inserted in an existing track rail, without there being any necessity of removing pieces of rail from said existing track rail, as has to be done in the case of conventional switches. For simple branches having no switching function, it will, moreover, suffice to lead the branching rail along a curved path, analogously to the switch leg, up to the first rail and to conduct it parallel to said first rail at least along the distance which is required for lifting the conveyor means from the first rail.

Figures 9, 10:
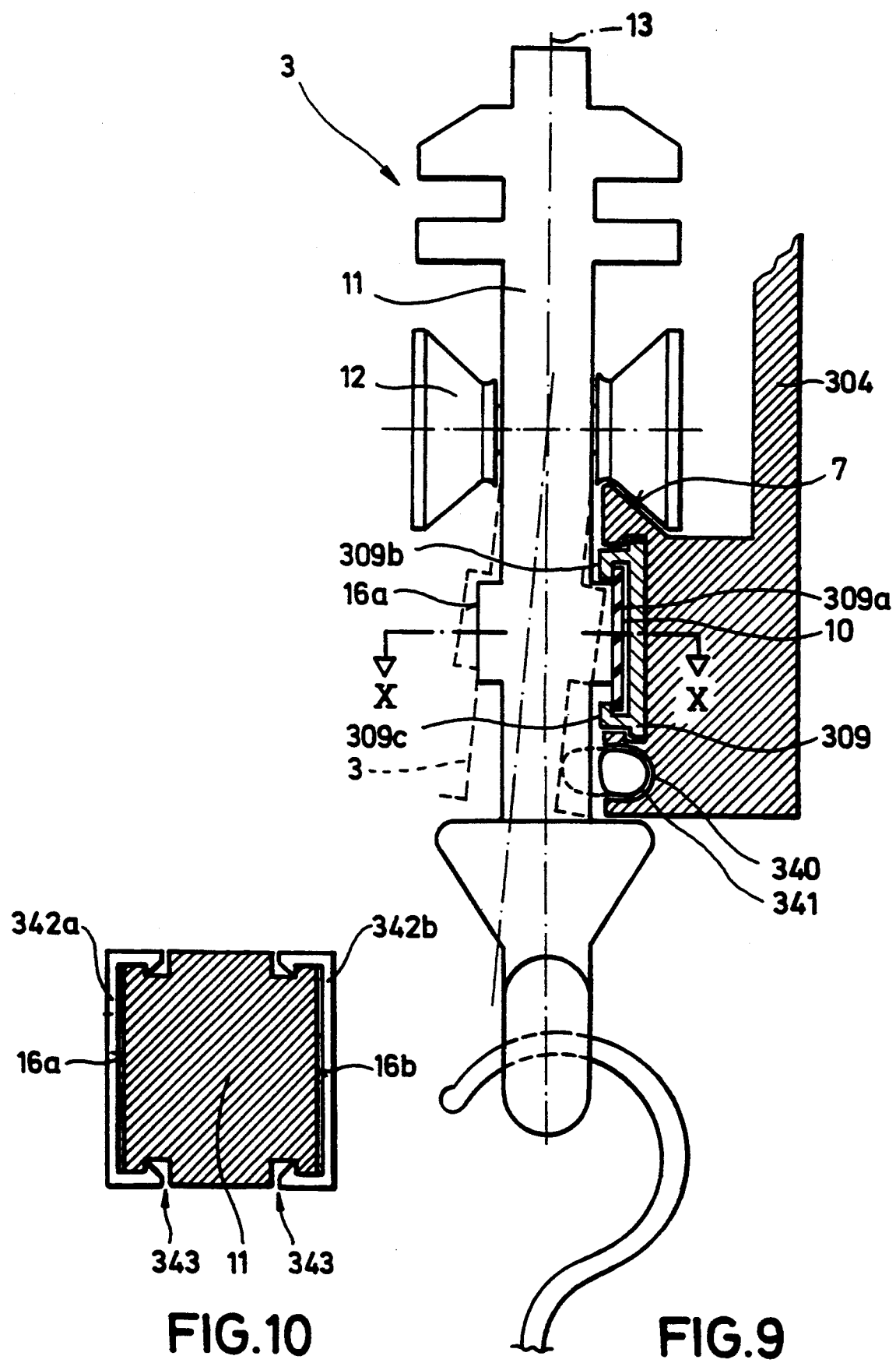
FIG. 9 is a view of an additional embodiment similar to that of FIG. 2.
FIG. 10 is an enlarged sectional view taken along the line X—X of FIG. 9.

FIG. 9 shows the conveyor means 3 of FIG. 2, identical or comparable structural components being designated by identical reference numerals and being not explained once more. A rail 304 is again provided, which differs from the rail 4 of FIG. 1 with respect to a deviating guide means 309. The guide means 309 is equipped with a reception cavity 309a for the unchanged friction belt 10, said reception cavity 309a being delimited by an upper boundary flange 309b and by a lower boundary flange 309c in the direction of the conveyor means 3. The flanges 309b and 309c extend perpendicularly to the plane of the drawing either over the whole length of the reception cavity 309a or only in certain areas thereof. In the direction in which the plane of symmetry 13 of the conveyor means 3 extends and in the direction of the width of the friction belt 10, the upper flange 309b is higher than the lower flange 309c. In this direction, the reception cavity 309a has approximately a height corresponding to the width of the friction belt 10 plus the height of the lower flange 309c so that both flanges 309b and 309c will extend over the longitudinal edges of the friction belt 10, when said friction belt 10 has been received in the guide means 309 and abuts, under the influence of gravity, on the lower end of said reception cavity 309a on the guide means 309. If, however, the friction belt 10 is displaced upwards, i.e. in the direction of the running track 7, the lower longitudinal edge of said friction belt 10 will be positioned above the lower flange 309c so that said lower longitudinal edge of said friction belt 10 can be tilted outwards over said lower flange 309c, whereupon said friction belt 10 can be drawn out below the upper flange 309b. For the purpose of inserting the friction belt 10, the above operation is carried out in reverse order. In this way, it will be possible to remove the friction belt from the guide means 309, although, when in operation, said friction belt is safely kept in position.

Below the guide means 309 for the friction belt 10, the rail 304 has formed therein a recess 340, which is open in the direction of the conveyor means 3. The rail has inserted therein a body 341 whose shape can be varied, said body being preferably an inflatable hose. In the slack condition, said hose is not in engagement with the conveyor means 3. If said hose 341 is inflated, it will expand up to the position indicated by a broken line in the drawing and come into contact with the conveyor means 3, whereupon it will raise said conveyor means 3 from the friction belt 10 up to the position indicated by the broken line, the conveyor means 3 being tilted in the course of this process transversely to the direction of transport about a center of motion located in the vicinity of the axis of rotation of the casters 12. In this position, the conveyor means 3 will no longer be entrained by the friction belt 10 so that it can easily be seized by hand, e.g. for the purpose of removal. The inflatable hose 341 can be provided only in certain areas, at suitable points, or it can extend throughout the whole transport path.

FIG. 10 shows a further modification of the conveyor means 3 disclosed in FIG. 9; in the case of said modification, pieces of friction material 342a and 342b have additionally been arranged on the friction surfaces 16a and 16b. These pieces of friction material 342a and 342b are constructed as locking clips and they are releasably snapped in position in grooves 343 on the bearing member 11. The pieces of friction material 342a and 342b preferably cover the whole friction surfaces 16a and 16b and serve to improve the frictional engagement between the conveyor means 3 and the friction belt 10; this will be expedient e.g. on transport paths which extend along vertically displaced planes, i.e. which comprise descending and ascending path sections. In cases in which the conveyor means 3 is specially constructed for this type of transport paths, the friction material can also be fixedly connected to the conveyor means. If the conveyor means is always guided by means of the same caster over descending and ascending path sections, the additional friction material can also be provided on only one of the two friction surfaces.

As further modifications of the embodiments described and shown in the drawings, details, which have been described on the basis of the individual figures, can be interchanged. For example, also the conveyor means according to FIG. 2 can be provided with the casters according to FIG. 6, which rotate about inclined axes. Moreover, the peripheral surfaces of the casters can be slightly convex so as to facilitate curve going. Finally, also the conveyor means according to FIG. 6 can be provided with a second travelling system. Instead of the hook as a support means, two conveyor means can be connected, in a known manner, by a cross bar so as to obtain a transport carriage.

It is claimed:

1. A suspension conveyor system comprising a conveyor means adapted to run along a track rail having at least one rolling track, said track rail including at least one of straight track sections, curved track sections and switch sections, said conveyor means including a bearing member, a support member connected to the bearing member for supporting articles to be conveyed, and at least two rotating casters arranged on said bearing member symmetrically with respect to each other and a plane of symmetry that extends through said bearing member, said casters projecting outwardly from opposite sides of said bearing member, said conveyor means and said track rail being disposed so that said conveyor means runs along said track rail in a lateral suspension mode over said straight track sections, curved track sections and switch sections, with only one of said two casters running on said rolling track thereof, the plane of symmetry being maintained substantially vertically by a support means located between the conveyor means and the track rail and said conveyor means running always along only one track rail, the caster rolling along said rolling track thereof being selectively the caster on one side of the plane of symmetry whereas the caster on the other side of the plane of symmetry is not in engagement with a rolling track.

2. The suspension conveyor system of claim 1, wherein the rolling surfaces of at least part of the peripheral surfaces of the casters form an acute angle with said plane of symmetry.

3. The suspension conveyor system of claim 2, wherein the rolling track of the track rail is inclined downwards away from the plane of symmetry of the conveyor means at a corresponding angle to said acute angle when said conveyor means is in said lateral suspension mode.

4. The suspension conveyor system of claim 2 or 3, wherein the casters are truncated cones, the narrower ends of which face the plane of symmetry.

5. The suspension conveyor system of claim 2 or 3, wherein the casters are cylindrical and are rotatably connected to the bearing member so that the axis of rotation of each is inclined relative to the plane of symmetry at said acute angle.

6. The suspension conveyor system of claim 1, wherein the support means comprises a support caster rotatably mounted on the bearing member and a support surface located on said track rail over which said support caster rolls.

7. The suspension conveyor system of claim 1, wherein the support means comprises support surfaces engaged with one another and respectively located on the conveyor means and on the track rail.

8. The suspension conveyor system of claim 1, wherein the support means also functions as a drive means for moving the conveyor means along said track rail.

9. The suspension conveyor system of claim 8, wherein said drive means is a friction drive means comprising a friction belt that translates in a direction of movement parallel to the track rail, and said support means includes a friction surface located on the conveyor means for frictional contact with said friction belt.

10. The suspension conveyor system of claim 9, wherein the friction surface of the conveyor means is located on the bearing member in laterally spaced relationship with and parallel to said plane of symmetry.

11. The suspension conveyor system of claim 1, wherein the conveyor means has an arm located in spaced relationship with respect to the casters and adapted to be brought into engagement with a corresponding conveying surface of a conveying flange on the track rail.

12. The suspension conveyor system of claim 11, wherein said arm has two downwardly directed sliding surfaces that are symmetrical with and perpendicular to the plane of symmetry and which are adapted to be selectively brought into engagement with an upwardly directed, corresponding conveying surface on said conveying flange on the track rail.

13. The suspension conveyor system of claim 1, including tilt protection means on the conveyor means to further maintain the plane of symmetry substantially vertically.

14. The suspension conveyor system of claim 1, including transfer means on the track rail for transferring the conveyor means from a first track rail to a second track rail.

15. The suspension conveyor system of claim 14, wherein the transfer means includes a switch leg adapted to be moved into and out of a position in which a first free end thereof projects into the path of the movement of the unengaged caster of a conveyor means running along said first track rail, an opposite second free end of the switch leg adjoining said second track rail.

16. The suspension conveyor system of claim 15, wherein said first free end of the switch leg is an ascending ramp for removing the conveyor means from said first rail and the second free end is a descending ramp for feeding the detached conveyor means onto said second track rail.

17. The suspension conveyor system of claim 14, wherein the transfer means comprises a restricted guide means for the conveyor means.

18. The suspension conveyor system of claim 17, wherein the restricted guide means comprises a pusher moveable transversely with respect to the plane of symmetry.

19. The suspension conveyor system of claim 17 or 18, wherein the restricted guide means includes a projection part selectively engagable with a grooved part, one of said parts being located on the conveyor means and the other on said track rail.

20. The suspension conveyor system of claim 1, including a rerouting means for changing the direction of running of a conveyor means on a track rail, said rerouting means comprising a tail drum having a conveying surface for engagement with an arm on said conveyor means located in spaced relationship with respect to said casters.

21. The suspension conveyor system of claim 20, wherein the conveying surface rotates about the axis of the tail drum, and a sliding surface on the arm of the conveyor means rests on LAW OFFICES the conveying surface and is entrained thereby.

22. The suspension conveyor system of claim 21, including a guide ridge for the arm of the conveyor means located adjacent the tail drum.

23. The suspension conveyor system of claim 22, including a transfer means located in the area of the tail drum for transferring said conveyor means from said tail drum to a second track rail.

24. The suspension conveyor system of claim 23, wherein the transfer means includes a restricted guide means comprising a pusher having two spaced webs for engagement with the arm of the conveyor means, which pusher can selectively be oriented relative to the guide ridge of the tail drum in such a way that the conveyor means will either be moved on by the tail drum or shifted from said tail drum onto said second rail.

25. The suspension conveyor system of claim 1, including at least two track rails each forming a closed rail loop for a conveyor means and a transfer means located between said loops to transfer a conveyor means from one rail loop to the other, one caster being in engagement with the track rail in one rail loop and the other caster in engagement with the track rail of the other rail loop following transfer by the transfer means.

26. The suspension conveyor system of claim 9, wherein the friction belt is received in a reception cavity of a guide means, said guide means having an upper and a lower holding flange that define said reception cavity and that extend out and over the entrance of said cavity, the width of the reception cavity being larger and the distance between the ends of the holding flanges being smaller than the width of the friction belt between its longitudinal edges, the upper holding flange extending further over said entrance than the lower holding flange.

27. The suspension conveyor system of claim 8, including variable removing means for removing the conveyor means from engagement with the drive means.

28. The suspension conveyor system of claim 27, wherein the variable removing means is an inflatable body.

29. The suspension conveyor system of claim 27, wherein the variable removing means is located below the rolling track.

30. The suspension conveyor system of claim 9, including additional friction material between the conveyor means and the friction belt.

31. The suspension conveyor system of claim 30, wherein the additional friction material is releasably fastened.

32. The suspension conveyor system of claim 30, wherein the additional friction material is located on the conveyor means.

33. A suspension conveyor system comprising a conveyor means adapted to run along at least a first and a second track rail system with a switch section therebetween for transferring said conveyor means from first track rail system to said second track rail system, said first and second track rail systems each comprising a track rail including straight track sections or curved track sections, said track rail sections having at least one rolling track, said conveyor means including a bearing member, a support member connected to the bearing member for supporting articles to be conveyed, and at least two rotating casters arranged on said bearing member symmetrically with respect to each other and to a plane of symmetry that extends through said bearing member, said casters projecting outwardly from opposite sides of said bearing member, said conveyor means and said track rail being disposed so that said conveyor means runs along said track rail in a lateral suspension mode over said straight track sections and said curved track sections with one of said two casters of said conveyor means rolling on said rolling track of said track rail of said first track rail system while the other of said casters rolls on said rolling track of said track rail of said second track rail system after said conveyor means has passed through said switch section between said two systems, said plane of symmetry being maintained substantially vertically by a support means located between said conveyor means and said track rails.

* * * * *